(12) United States Patent
Koivula

(10) Patent No.: US 6,499,605 B1
(45) Date of Patent: Dec. 31, 2002

(54) FILTER

(75) Inventor: Tuomo Koivula, Tampere (FI)

(73) Assignee: Parker Hannifin Oy, Vantaa (FI)

( * ) Notice: Subject to any disclaimer, the term of this patent is extended or adjusted under 35 U.S.C. 154(b) by 0 days.

(21) Appl. No.: 09/625,733

(22) Filed: Jul. 26, 2000

Related U.S. Application Data

(63) Continuation of application No. 09/096,871, filed on Jun. 11, 1998, now Pat. No. 6,227,381, which is a continuation of application No. PCT/FI96/00663, filed on Dec. 13, 1996.

(30) Foreign Application Priority Data

Dec. 14, 1995 (FI) .................................................. 956004

(51) Int. Cl.$^7$ .......................... B01D 27/00; B01D 35/00; B01D 35/28
(52) U.S. Cl. ...................................................... 210/440
(58) Field of Search ........................................ 210/440

(56) References Cited

U.S. PATENT DOCUMENTS

| | | |
|---|---|---|
| 3,546,853 A | 12/1970 | Claar |
| 3,556,300 A | 1/1971 | Codo |
| 3,920,553 A | 11/1975 | Cilento |
| 4,338,054 A | * 7/1982 | Dahl .......................... 411/424 |
| 4,544,387 A | * 10/1985 | Agerlid ....................... 210/450 |
| 5,342,519 A | 8/1994 | Friedmann et al. |
| 5,374,355 A | * 12/1994 | Habiger et al. ............. 210/450 |
| 5,538,626 A | 7/1996 | Baumann |

FOREIGN PATENT DOCUMENTS

| | | | |
|---|---|---|---|
| DE | 1182637 | 12/1964 | |
| DE | 1536766 | 1/1970 | |
| DE | 23 26 212 | 12/1977 | |
| DE | 4124323 | * 1/1993 | .......... 210/DIG. 17 |
| DE | 4139680 | 6/1993 | |
| EP | 526932 | * 10/1993 | .......... B01D/27/06 |
| EP | 0 663 226 A1 | 1/1995 | |
| EP | 0 663 226 A1 | 7/1995 | |
| FI | 98990 | 6/1997 | |
| GB | 114266 | 5/1968 | |
| GB | 2 192 140 A | 1/1988 | |
| SE | 335 321 | 5/1971 | |

OTHER PUBLICATIONS

Copy of International Preliminary Examination Report for PCT Case No. PCT/FI96/00663 of Parker Hannifin OY entitled "Filter".

* cited by examiner

Primary Examiner—Thurman K. Page
Assistant Examiner—Humera N. Sheikh
(74) Attorney, Agent, or Firm—Joseph J. Pophal

(57) ABSTRACT

The invention relates to a spin-on filter for filtering a flowing substance, especially to a filter for hydraulic liquid or lubricating oil in combustion motors. The filter comprises a casing, which is openable at one end, a substantially cylindrical replaceable filter means fitted inside the casing, the flow to be filtered having been arranged to pass through the filter means mantle, and a collar for connecting the filter with a device assembly, which includes inlet and outlet ducts for flow to be filtered. In accordance with the invention, the filter comprises a support member forming a solid extension of the collar, consisting of an axial spindle inside the filter means and of an end flange at its end opposite to the collar, the periphery of the end flange being tightly sealed against the inner wall of the casing such that the support member will receive a positive internal pressure within the casing axially. The joints between the support member and the collar, and the collar and the device assembly, respectively, may consist of threaded joints. As the flow to be filtered passes from the outside to the inside of the filter means, the means may bear against a perforated support pipe extending inside the means from the collar to the end flange of the support member.

30 Claims, 3 Drawing Sheets

FILTER

CROSS REFERENCE TO RELATED APPLICATIONS

This application is continuation of U.S. Ser. No. 09/096,871, filed Jun. 11, 1998, now U.S. Pat. No. 6,227,381, which is a continuation of copending International Application No. PCT/FI96/00663 filed Dec. 13, 1996, which designated the United States, and which claims priority to Finish Patent Application 956004, filed Dec. 14, 1995.

FIELD OF THE INVENTION

This invention relates to a filter for filtering a flowing substance, such as oil, comprising a casing which is openable at one end, a substantially cylindrical, replaceable filter means fitted within the casing, the flow to be filtered being arranged to pass through the mantle of the filter means, and a collar for connecting the filter to the device assembly, which includes inlet and outlet ducts for the flow to be filtered.

BACKGROUND OF THE INVENTION

One of the applications of encased cylindrical filters is filtering lubricating oil in combustion motors so as to keep the oil free of impurities in operation. A second typical field of application for filters of this type is filtering hydraulic liquid in hydraulic systems. Since the filter is fouled in operation and has to be replaced at intervals, the filter casing must be removable from the device assembly to which it is attached.

There are previously known oil filters, in which the filter means and the surrounding casing have been constructed as a solid unit, replaceable as such. However, such a design is a waste of material and also produces waste in abundance. From an ecological viewpoint, it is preferable to devise a casing that can be opened, so that the clogged filtering means alone is replaceable and the casing including a replacement means is put back in position in the device assembly. Patent application No. FI 955127 is cited as an example of such a design, in which the assembled oil filter described comprises a cylindrical, replaceable filter means, a perforated support pipe within the means, a collar as an extension of this pipe, a casing surrounding the means and a joint ring at the casing mouth. The collar has a thread, which connects the assembled filter with the device assembly, simultaneously providing a sealing between the joint ring and the device assembly.

In conventional filters of the type above, the casing must resist axial stress caused by the high pressure of the substance to be filtered, such as oil or hydraulic liquid, and for this reason the casing must be made of a rigid sheet material. The perforated support pipe must also be stiff enough to withstand the internal axial stress within the casing. However, the manufacture of such perforated pipes is awkward in terms of production techniques.

The purpose of this invention is to provide a filter with adequate resistance to the pressure within the filter casing caused by the substance to be filtered, and with the lower production costs than conventional filters. The filter in accordance with the invention is characterized by the fact that it includes a support member forming a solid extension of the collar, and consisting of an axial spindle inside the filter means and of an end flange at the end opposite to the collar, the periphery of the end flange being tightly sealed to the inner wall of the casing such that the support member will receive the internal pressure within the casing axially.

SUMMARY OF THE INVENTION

In a filter in accordance with the invention, the axial traction force caused by the pressure is not at all exerted on the casing, but merely on the spindle of the support member and on the end flange, thus allowing a thinner material thickness in the casing wall. If the filter is equipped with a perforated support pipe placed against the filter means, this may also be made thinner than before, which is a significant benefit in terms of manufacture techniques. Since the end flange sealed against the casing seals the pressurized casing interior to be filled with the substance to be filtered, the casing end does not have to be sealed as in conventional filters, but instead, the casing may be formed of a sleeve-like tubular piece which is open at either end.

In the filter in accordance with the invention, the support member including the spindle and the collar connecting the filter with the device assembly may be discrete components connected with each other by a threaded joint. In this manner, these components are joined by a joint with high mechanical strength and resistance to the traction force, which also is easy to open with a view to replace the collar, for instance. By a simple replacement of the collar, the filter is adaptable to threads of various sizes provided for the filter in the device assembly.

The filter in accordance with the invention preferably includes a joint ring between the openable casing end and the device assembly, the joint ring including one or more flow openings, through which the casing interior communicates with one or more inlet ducts for the flow to be filtered in the device assembly. In this case, the flow is steered into the casing outside the mantle of the cylindrical filter means, from where the flow is filtered inside the mantle, and eventually is removed via the inside of the collar into the outlet duct for filtered flow in the device assembly. In this case, the inner surface of the filter means may bear against the perforated support pipe, which can be advantageously manufactured of a thinner material than before, as indicated above.

The invention will be described in greater detail below by means of examples and with reference to the accompanying drawings, of which.

DETAILED DESCRIPTION OF THE PREFERRED EMBODIMENT

Figure 1:
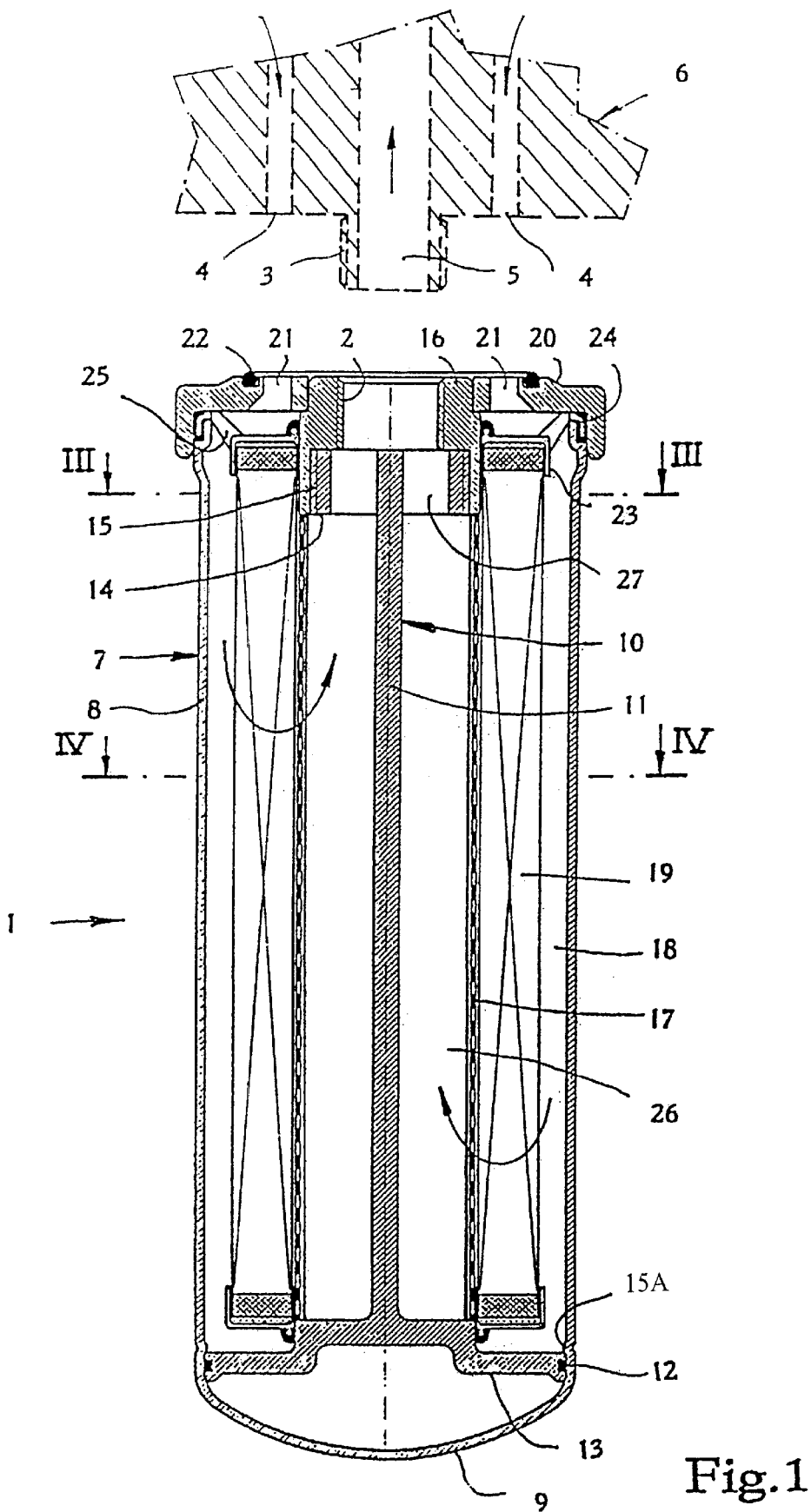
FIG. 1 shows an oil filter with a sleeve-like casing in accordance with the invention, and a device assembly to which the filter can be attached by screwing.

FIG. 1 illustrates a "spin-on filter" 1 in accordance with the invention, which is especially suitable as a replaceable oil filter in a combustion engine. The filter consists of components, which, assembled as in FIG. 1, can be connected by a first threaded joint 2, 3 to device assembly 6 comprising inlet and outlet ducts 4, 5 for the flow to be filtered.

The filter in FIG. 1 comprises a sleeve-like casing 7 appropriately made of metal or plastic, which has a cylindrical, casing mantle or wall 8, a closed end 9 that is unitary with the cylindrical wall, and an end that is open at its opposite end facing the device assembly 6. Inside casing 7 a support member 10 is disposed, which consists of an axial spindle 11 with a cross-shaped cross-section, an end flange 13 placed at the spindle end and sealed against the inner surface of the casing mantle 8, with a sealing means in the form of an O-ring joint 12, and of a ring element 14 at the opposite end of the spindle, facing the casing mouth, the support member being attached to the collar 16 attaching the filter to the device assembly 6 by means of a second threaded joint 15.

The cylindrical inner surface of the casing includes a convex bead 15*a* extending radially inward toward the central axis. The convex bead 15*a* is in abutting contact with a radial surface of the end flange that faces axially toward the open end of the casing. The bead prevents the end flange from moving axially toward the open end of the casing such that the radial surface of the end flange will axially support a force caused by an interior pressure in the casing directed axially towards the closed end of the casing.

The cross-shaped spindle 11 is surrounded by a perforated support pipe 17, which extends from the collar 16 axially to the end flange 13 of the support member. In the outer space 18 between the support pipe 17 and the casing mantle 8, a cylindrical, replaceable filter means 19 has been fitted. Placed against the open end of the casing 7 is a joint ring 20 between the casing and the device assembly, the joint ring having flow openings 21 to connect the inlet ducts 4 for flow to be filtered in the device assembly with the interior outer space 18 of the casing. The joint ring 20 is equipped with a first O-ring seal 22 to seal the filter 1, when screwed into position, against the device assembly 6. The sealing between the casing 7 and the joint ring 20 is provided by moulding the outer edge of the end flange 23 of the filter means 19 as a second O-ring seal 24 placed against the outer surface of the casing mouth. Inside the edge 24 acting as a seal the flange 23 has openings 25 for the incoming flow of substance to be filtered.

A filter 1 assembled as in FIG. 1 is attached to device assembly 6 by screwing the internal thread of first threaded joint 2 in collar 16 into the matching external thread 3 in the device assembly. With filter 1 in operation, the flow to be filtered is directed from inlet ducts 4 through the joint ring 20 and flow inlets 21, 25 in the end flange 23 of the filter means into the outer space 18 delimited by casing 7, from where the flow is filtered through the filter material layer in filter means 19 and the perforated support pipe 17 into the inner space 26 within the pipe, from where the filtered flow is removed into outlet duct 5 in the device assembly through the openings 27 defined between radial spokes 28 in the end ring 14 of the support member 10 and the collar 16. The flow direction is indicated with arrows in FIG. 1.

A clogged filter means 19 is replaced by screwing off the filter 1 from the device assembly 6, by withdrawing the joint ring 20 from the casing 7 and the collar 16 and by removing the filter means 19 from the outer space 18 between the casing and the support pipe. After this, a new filter means 19 is fitted into outer space 18 with the outer edge 24 of its end flange 23 fitted as a seal around the mouth of casing 7, and subsequently the joint ring 20 is pressed into position and the filter thus assembled is fixed to the device assembly 6 by screwing it to the assembly as a unit.

Figure 2:
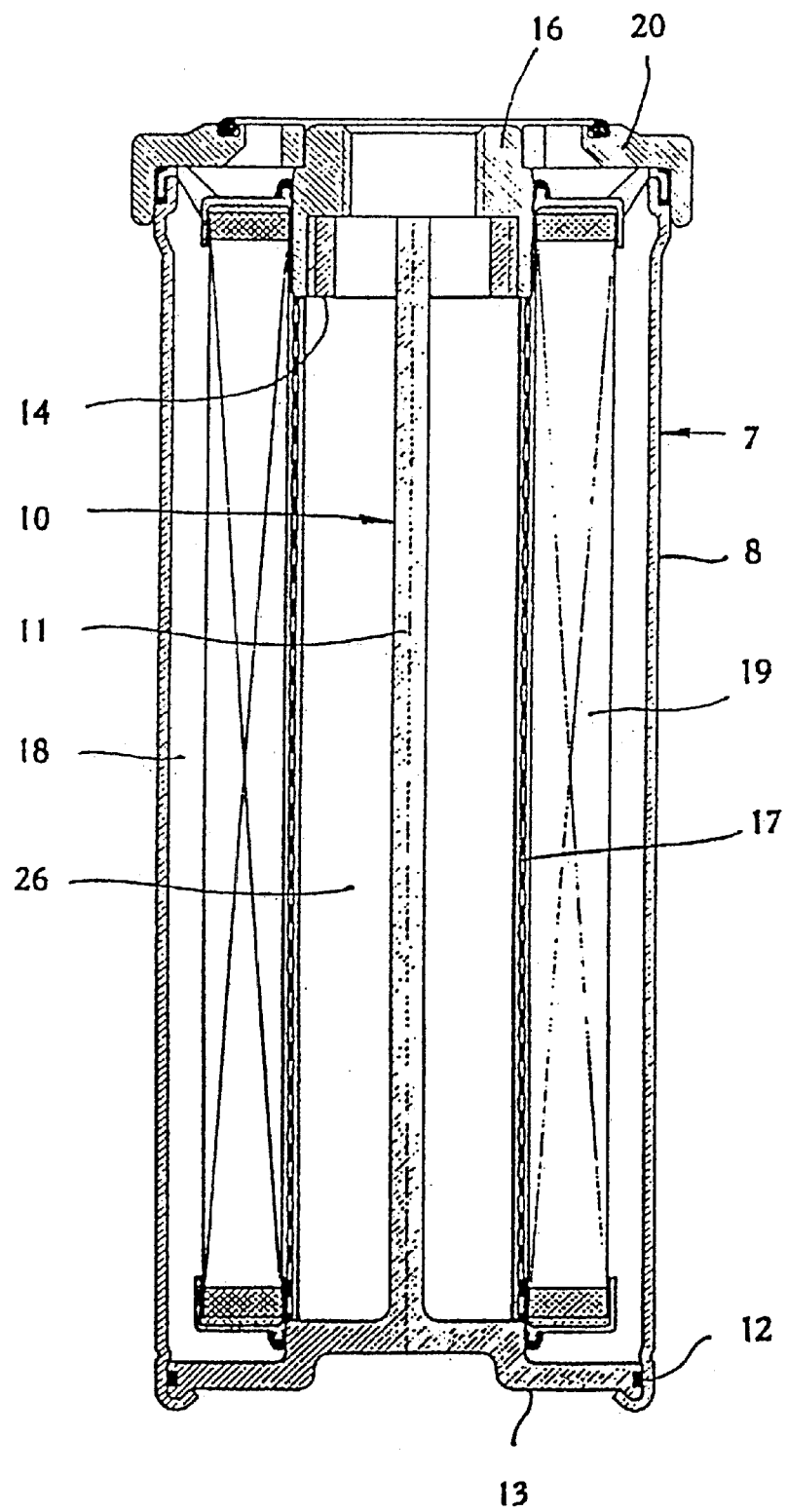
FIG. 2 shows a second oil filter with a sleeve-like casing in accordance with the invention.
Figure 3:
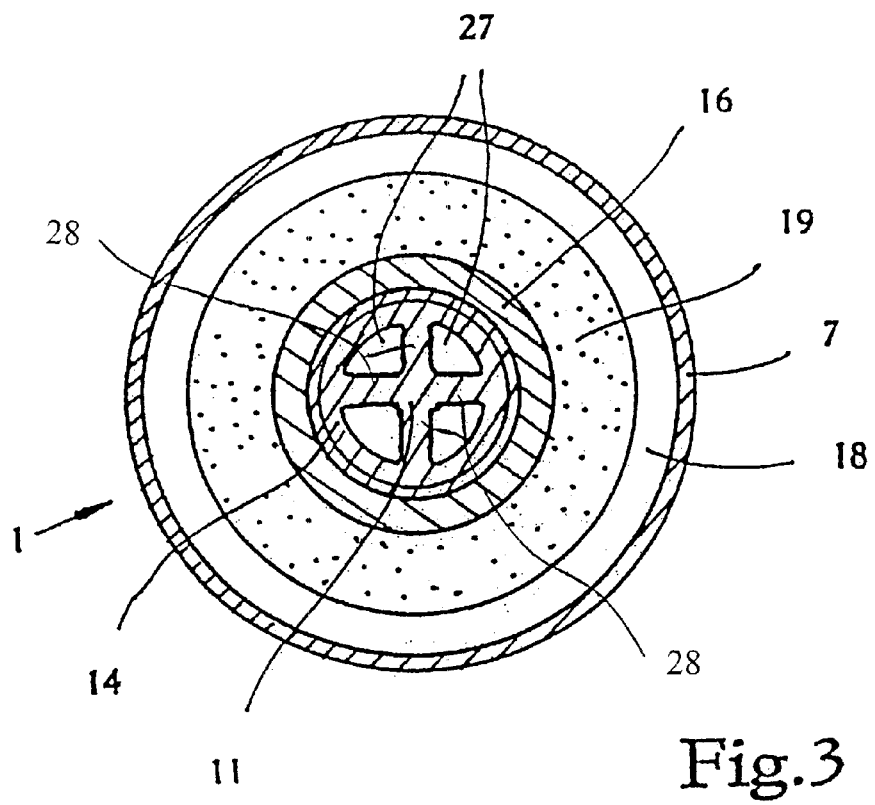
FIG. 3 shows a cross-section of the filter along line III—III of FIG. 1.
Figure 4:
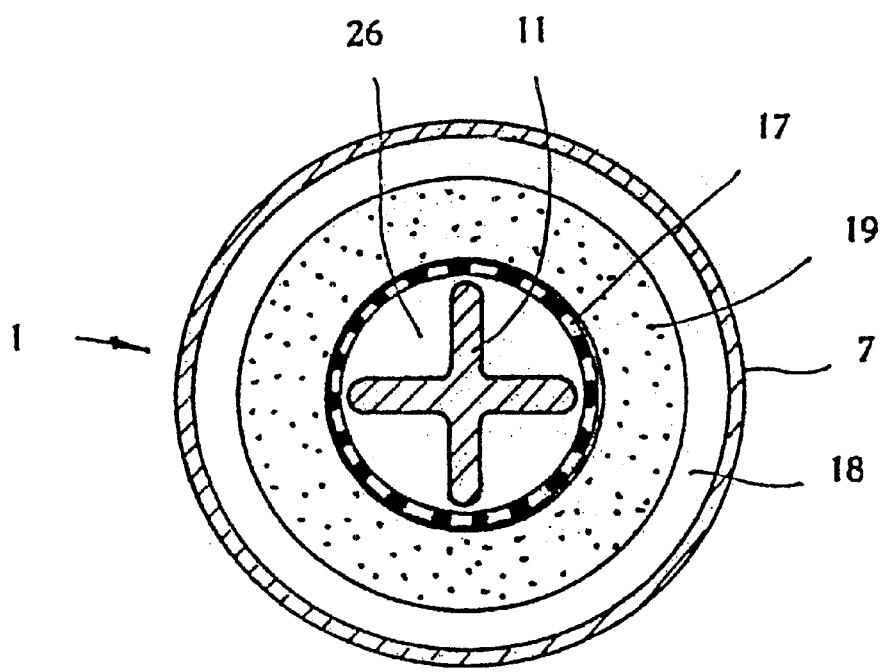
FIG. 4 shows a cross-section of the filter along line IV—IV in FIG. 1.

The optional embodiment of the invention shown in FIG. 2 differs from the embodiment of FIG. 1 in that the casing 7 consists of a cylindrical sleeve, which is tightly sealed at its end opposite to the device assembly by the end flange 13 of the support member 10. In other respects, the presentation above of the design and operation of the filter of FIG. 1 applies as such to the filter in FIG. 2.

It is obvious to those skilled in the art that the various embodiments of the invention are not restricted to the examples given above, but may vary within the scope of the accompanying claims. Thus, the threaded joint between the filter 1 and the device assembly 6 may differ from FIGS. 1 and 2 in that the filter collar 16 is provided with an external thread and the device assembly with a matching internal thread. Besides lubricating oil filters, the filters in accordance with the invention may also serve as hydraulic liquid, liquid fuel or water filters.

What is claimed is:

1. A filter for filtering a flowing substance, the filter comprising a casing having a cylindrical wall surrounding a central axis, said casing including an open first end and a second end opposite the first end, a substantially cylindrical, replaceable filter means fitted coaxially surrounding the central axis and positioned inside the casing, a flow to be filtered being arranged to pass through the filter means, and a collar coaxially surrounding the central axis and positioned at the first end of the casing for connecting the casing to a device assembly including inlet and outlet ducts for the flow to be filtered, the filter including a support member coincisent with the central axis which is distinct from the casing and extends axially from the collar, the support member being formed of an axial spindle having first and second opposite ends and being positioned within the filter means, a connection for connecting the first end of the spindle to the collar, an end flange at the second end of the spindle opposite to first end of the spindle, said end flange being a separate component from the casing and including a cylindrical outermost surface that is surrounded by and in fixed, radially-sealed engagement with an inner cylindrical surface of the cylindrical wall of the casing to prevent the end flange from moving axially toward the first end of the casing, whereby the radial surface of the end flange will receive a force caused by a positive interior pressure in the casing directed axially towards the second end of the casing.

2. The filter as claimed in claim 1, wherein the support member and the collar are discrete components joined by a threaded joint.

3. The filter as claimed in claim 2, wherein the collar includes a thread for connecting the collar with the device assembly.

4. The filter as claimed in claim 1, wherein the collar includes a thread for connecting the collar with the device assembly.

5. The filter as claimed in claim 1, wherein the spindle of the support member is substantially cross-shaped in cross-section.

6. The filter as claimed in claim 1, wherein an O-ring seal surrounds the end flange of the support member, and provides a seal between the cylindrical outermost surface of the flange and the inner cylindrical surface of the casing wall.

7. The filter as claimed in claim 1, wherein the flow to be filtered is arranged to pass from an outside to an inside surface of the filter means, in that the filter can be connected via an inside of the collar with an outlet duct for the filtered flow in the device assembly and in that the spindle of the support member is surrounded by a perforated pipe, the perforated pipe supporting the filter means along the inside surface.

8. The filter as claimed in claim 1, wherein the second end of the casing is closed by an end wall that is unitary with the second end of the casing, and the end flange is axially inwardly-spaced from the end wall of the casing at least along the central axis of the end flange.

9. The filter as claimed in claim 1, wherein the second end of the casing is closed by the end flange of the support member, the end flange being unitary with the spindle.

10. The filter as claimed in claim 1, wherein the filter includes a joint ring between the first end of the casing and the device assembly, the joint ring having one or more openings to allow the casing interior to communicate with the inlet duct for flow to be filtered in the device assembly.

11. The filter as claimed in claim 10, further including a seal located on the outer surface of the casing between the first end of the casing and the joint ring.

12. The filter as in claim 2, wherein the first end of the spindle includes an end ring with external threads for threadably engaging with internal threads formed in the collar, and at least flow opening for a liquid to flow is provided between the spindle and the end ring.

13. The filter as in claim 12, wherein the end ring surrounds the first end of the spindle adjacent the collar and is fixed to the collar with radial spokes, and a plurality of openings for a liquid to flow are defined between the radial spokes.

14. The filter as claimed in claim 1, wherein the end flange has a cylindrical raised portion radially inwardly-spaced from the cylindrical outermost surface, and the filter means has an end that is received around and seals to the cylindrical raised portion of the end flange.

15. The filter as in claim 14, wherein the end flange is formed unitary with the spindle.

16. A filter for filtering a flowing substance, the filter including a casing having a cylindrical wall surrounding a central axis, said casing including an open first end and second end opposite the first end, a substantially cylindrical, replaceable filter element disposed coaxially surrounding the central axis and positioned within the casing, a collar coaxially surrounding the central axis and positioned at the first end of the casing with a thread which enables the casing of the filter to be connected from said first end with a device assembly, and a joint ring enclosing the open end of the casing and including inlet and outlet openings, a support member coincident with the central axis and positioned and being separate from the casing extends axially from the collar, the support member including i) an axial spindle extending within the filter element having first and second ends, a connection for fixedly connecting the first end of the spindle to the collar, and ii) an end flange at a second end of the spindle away from the first end of the spindle, said end flange including a cylindrical outermost surface that is surrounded by and in fixed, radially-sealed engagement with an inner cylindrical surface of the cylindrical wall of the casing, to prevent the end flange from moving axially toward the first end of the casing, whereby the radial surface of the end flange will axially support a positive interior pressure in the casing directed axially towards the second end of the casing.

17. The filter as claimed in claim 16, wherein the support member and the collar are discrete components joined by a threaded joint.

18. The filter as claimed in claim 16, wherein the spindle of the support member is substantially cross-shaped in cross-section.

19. The filter as claimed in claim 16, wherein the an O-ring seal surrounds the end flange of the support member, and provides a seal between the cylindrical outermost surface of the flange and the inner cylindrical surface of the casing wall.

20. The filter as claimed in claim 16, wherein a flow to be filtered is arranged to pass from an outside to an inside surface of the filter means, in that the filter can be connected via an inside of the collar with an outlet duct for the filtered flow in the device assembly and in that the spindle of the support member is surrounded by a perforated pipe, the perforated pipe supporting an inner surface of the filter element along the inside surface of the filter means.

21. The filter as claimed in claim 16, wherein the second end of the casing is closed by an end wall that is unitary with the second end of the casing, and the end flange is axially inwardly-spaced from the end wall of the casing at least along the central axis of the end flange.

22. The filter as claimed in claim 16, wherein the second end of the casing is closed by the end flange of the support member, the end flange being unitary with the spindle.

23. The filter as claimed in claim 16, further including a seal located on an outer surface of the casing between the first end of the casing and the joint ring.

24. The filter as in claim 17, wherein the support member further includes an end ring with external threads, and at least one flow opening is provided between the spindle and the end ring.

25. The filter as in claim 24, wherein the end ring surrounds an end of the spindle adjacent the collar and is fixed to the collar with radial spokes, and a plurality of flow openings are defined between the radial spokes.

26. The filter as in claim 16, wherein the end flange has a cylindrical raised portion radially inwardly-spaced from the cylindrical outermost surface, and the filter element has an end that is received around and seals to the cylindrical raised portion of the end flange.

27. The filter as in claim 16, wherein the end flange is formed unitary with the spindle.

28. A filter for filtering a liquid substance, the filter comprising a casing having a cylindrical wall surrounding a central axis, said casing including an open first end and a second end opposite the first end, a substantially cylindrical, replaceable filter means fitted coaxially surrounding the central axis and positioned inside the casing, a liquid to be filtered being arranged to pass through the filter means, and a collar coaxially surrounding the central axis and positioned at the first end of the casing for connecting the casing to a device assembly including inlet and outlet ducts for the liquid to be filtered, the filter including a support member coincident with the central axis which is distinct from the casing and extends axially from the collar, the support member being formed of an axial spindle substantially cross-shaped in cross-section, the spindle having first and second opposite ends and being positioned within the filter means, a connection for connecting the first end of the spindle to the collar, and end flange at the second end of the spindle opposite to first end of the spindle, said end flange being a separate component from the casing and including a cylindrical outermost surface that is surrounded by and in fixed, radially-sealed engagement with an inner cylindrical surface of the cylindrical wall of the casing to prevent the end flange from moving axially toward the first end of the casing, whereby the radial surface of the end flange will receive a force caused by a positive interior pressure in the casing directed axially towards the second end of the casing.

29. The filter as claimed in claim 28, wherein the liquid to be filtered is arranged to pass from an outside to an inside surface of the filter means, in that the filter can be connected via an inside of the collar with an outlet duct for the filtered liquid in the device assembly and in that the spindle of the support member is surrounded by a perforated pipe, the perforated pipe supporting the filter means along the inside surface.

30. The filter as claimed in claim 28, wherein the filter includes a joint ring between the first end of the casing and the device assembly, the joint ring having one or more openings to allow the casing interior to communicate with the inlet duct for liquid to be filtered in the device assembly.

* * * * *